Nov. 28, 1939.  F. J. GIVEN  2,181,695
ELECTRICAL CONDENSER
Filed July 29, 1936
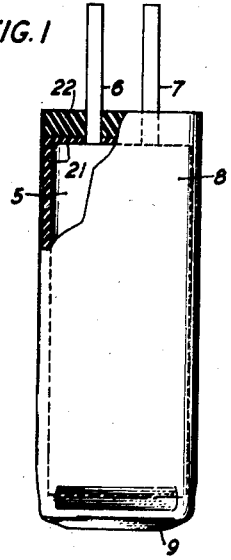
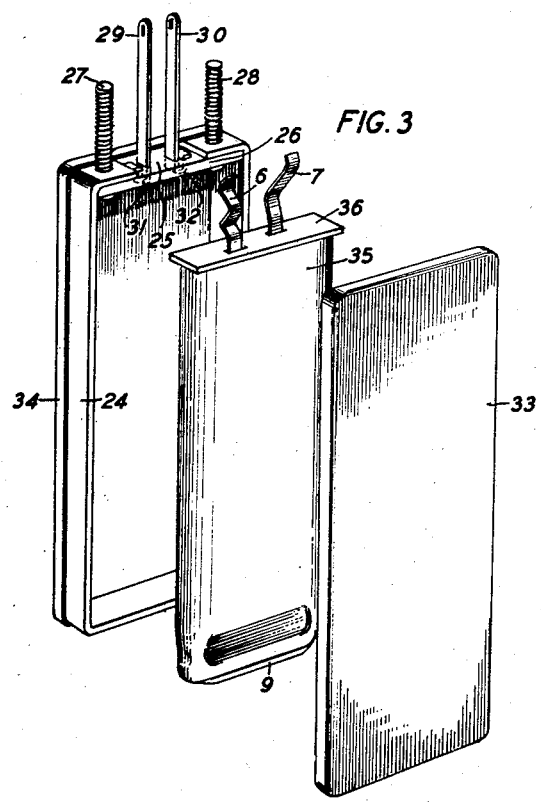
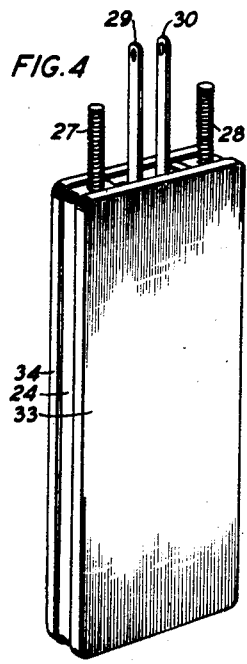
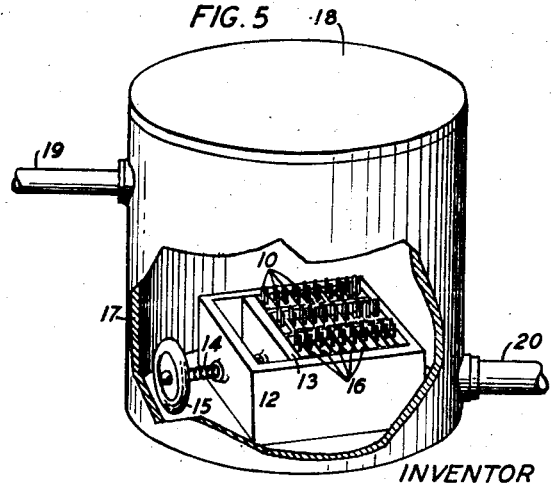
INVENTOR
F. J. GIVEN
BY
ATTORNEY Patented Nov. 28, 1939

2,181,695

UNITED STATES PATENT OFFICE 2,181,695

ELECTRICAL CONDENSER

Frederick J. Given, East Orange, N. J., assignor to Bell Telephone Laboratories, Incorporated, New York, N. Y., a corporation of New York Application July 29, 1936, Serial No. 93,183

2 Claims. (Cl. 175—41)

This invention relates to electrical condensers and more particularly to an improved condenser structure and method for its construction which has for its main objective the prevention of moisture absorption by the unit during and subsequent to its manufacture.

Heretofore in the manufacture of paper and foil condenser units it has been the common practice to roll the paper and foil into a compact unit, press it into a flat shape, dry and impregnate it with a suitable insulating compound. The impregnated unit is later placed in a suitable container and the space surrounding the unit in the container is filled with a potting compound. In certain cases, it is desirable to test the unit for capacity before it is potted in the container and the units are, therefore, exposed more or less to the moisture in the atmosphere. It is also desirable to have a supply of the unpotted units on hand so that the condensers of various capacities may be made by placing a number of the units in a suitable sized casing and then potting them. However, exposure of the unpotted units to the atmospheric moisture promotes their deterioration and consequently such practices are often undesirable.

An object of the present invention is an improved condenser unit structure which is moisture-proof and can be tested or stored without being disadvantageously affected by humid conditions.

Another object of the invention is a method of forming an encased condenser unit which does not permit absorption of moisture during manufacture.

Still another object of the invention is an impregnated condenser in which the impregnating compound completely surrounds the condenser unit and is prevented from draining away while in a liquid condition.

In accordance with the invention these and other objects are attained by inserting a condenser unit having suitable terminals attached thereto in a soft pliable casing and pressing the casing and unit to a desired shape, and then drying and impregnating the unit while under pressure. The open end of the casing through which the terminals extend is then sealed up with a suitable sealing compound. In the preferred form of the invention the metal casing is a thin soft metal tube, closed at one end, which will exert no pressure on the unit after it has been removed from the press. The tube is also so pliable that the contraction of the sealing compound will bend the tube rather than pull away from it, thereby maintaining the moisture-tight seal at the open end of the casing. While this method of making a moisture-proof electrical condenser is particularly adaptable to rolled paper and foil condensers, stack condensers, such as mica and foil condensers, may be made in the same manner.

The invention will be more clearly understood from the following detailed description and drawing in which:

Fig. 1 is a view of a condenser unit installed in a moisture-proof pliable casing having the open end sealed with sealing compound, Fig. 2 is an end view of the encased unit shown in Fig. 1.

Fig. 3 is an exploded view showing the completed moisture-proof unit in position to be installed in an external protective casing;

Fig. 4 is a view of one form of the completed condenser; and

Fig. 5 shows a plurality of unimpregnated units held compressed in a clamping frame and placed in a vacuum tank, where they may be evacuated and then impregnated with insulating compound.

A portion of the vacuum tank is shown broken away in order to illustrate the method of clamping the units.

As shown in Fig. 1 a condenser unit 5 made, for example, by rolling together in a compact form alternate strips of conducting foil such as aluminum foil and dielectric, such as paper, and attaching suitable terminal leads 6 and 7 to the respective conducting foils, is inserted in a soft pliable casing 8 which is closed at one end 9. This casing 8 is preferably of thin lead foil and before being pressed may be in an oval or round form.

This condenser assembly comprising the soft pliable casing 8 with the paper and foil unit 5 therein is then pressed, dryed and impregnated with suitable insulating compound.

A plurality of such condenser assemblies in an upright position may be pressed, dried and impregnated while in a suitable press at the same time, for example, as shown in Fig. 5 in which a number of rows of assemblies 10 are shown mounted above each other in a press comprising a frame 12, a pressure member 13 and a screw 14 provided with a handle 15 for exerting the pressure. Between the horizontal rows of assemblies 10 additional metal pressure plates 16 are placed so that the pressure will be exerted more evenly on all the units in the press.

When the units have thus been pressed into the desired flat and substantially rectangular form, the press with the units preferably still under pressure is placed in a suitable vacuum tank for example as is also shown in Fig. 5. This vacuum tank comprises a metal body 17 having a seated cover 18, an air evacuating pipe 19 and a pipe 20 through which the insulating compound may be introduced without disturbing the vacuum.

This tank may be heated in any suitable manner known in the art to expel moisture from the assemblies; and the air and moisture contained in the tank and the assemblies may be drawn out of outlet pipe 19 by using any suitable combination of vacuum apparatus.

The impregnating compound may, if desired, be pre-treated to removed moisture and occluded gases therefrom. Various impregnating compounds known to the art may be employed, but particularly satisfactory results have been obtained with chlorinated naphthalene. The impregnating compound enters the open end of the condenser assemblies 10 and fills up the voids in the paper dielectrics as well as the voids in the metal casing thus preventing the reentrance of moisture or gases.

The units 5, as shown in Fig. 1 are thus ensheathed in impregnating compound 21 within their pliable casing. On completion of the impregnating process the press containing the units is removed from the vacuum apparatus and the open ends of the condenser assemblies through which terminals 6 and 7 extend may be immediately sealed in any satisfactory manner with a suitable sealing compound 22. If the pliable casing 8 is filled to the brim with impregnating compound a portion of this may be removed and replaced with the sealing compound. However, a fairly thick layer of impregnating compound should be left over the end of the unit to prevent interaction at the junction of the impregnating and potting compound from attacking the unit. It has been found that if the unit is impregnated with a chlorinated naphthalene and an asphaltic potting compound is employed to seal the lead foil container, the interaction of these materials will form a thin layer of a low melting elastic eutectic which provides a flexible bond between the sealing and impregnating compounds and adheres intimately to the lead foil container thereby providing a superior seal. In some cases, however, the assemblies may be cooled while being subjected to a further pressure before the ends are sealed up. The completed units as shown in Fig. 1 are thus tightly encased without the possibility of moisture having an opportunity of affecting the rolled condenser units since at no time after impregnation are they exposed to the air. This is made possible by using a moisture-proof casing which is pliable enough so that the unit can be pressed after it is in the casing, whereas formerly the unit was pressed and impregnated and then exposed to the air while being fitted into a casing. Due to the fact that the soft metal foil casing is pressed into intimate contact with the condenser unit the diffusion of moisture along the casing is greatly retarded in case of a defective seal or a puncture through the casing itself. As can be seen, the present method also eliminates the necessity of potting the impregnated unit. It has also been found that because of the pliability of the casing, the contraction of the sealing compound will bend the casing rather than pull away from it thus eliminating a defect present in many encased units heretofore used.

The condenser unit thus sealed in its moisture-tight container may be stored for future use without danger of atmospheric deterioration; it may be used in its present form, or it may be installed in a protective external casing for panel mounting. As is shown in Fig. 3 of the drawing, the condenser assembly 35 including an insulating plate 36 is to be placed in an external container which comprises a frame 24 bent into a rectangular shape and having an opening 25 at one end and a cover plate 34 affixed thereto. The opening 25 is closed by an insulating plate 26 which is held in position by bolts 27 and 28 which also serve as mounting studs for the external container. Terminals 29 and 30 are supported on the insulated mounting plate 26 and terminal leads 6 and 7 of the assembly 10 are soldered thereto at 31 and 32. The external container is completed by placing cover plate 33 on the frame 24 in a similar position to cover plate 34. The completed structure is shown in Fig. 4 in which similar numerals designate similar parts. This condenser structure is now ready for use. The invention is not limited to the above described external container since it is obvious that various containers would be suitable to encase moisture-proof condenser assembly 35 and that a plurality of such assemblies might be enclosed in a larger external casing. Neither is it limited to the use of a single unit in a pliable casing since two or more individual units may be placed in one casing and pressed, dried and impregnated together.

What is claimed is:

1. The method of making a condenser which comprises forming a condenser unit, placing said unit in a collapsible casing having an opening therein, pressing said encased unit to a desired shape, and while under such pressure subjecting the encased unit to drying, impregnating and cooling operations and then sealing said opening with a sealing compound.

2. The method of forming a condenser which comprises placing a condenser unit in a collapsible lead foil casing having only one opening therein, pressing said encased unit to a desired shape, vacuum drying said encased unit while under pressure, in a suitable vacuum apparatus, impregnating said unit while under pressure with an insulating compound without disturbing the vacuum, removing said unit from said vacuum apparatus and cooling said unit under an increased pressure, and sealing up the open end of the container with a layer of sealing compound that is impervious to moisture.

FREDERICK J. GIVEN.